US006182048B1

United States Patent
Osborn et al.

(10) Patent No.: US 6,182,048 B1
(45) Date of Patent: Jan. 30, 2001

(54) SYSTEM AND METHOD FOR AUTOMATED RISK-BASED PRICING OF A VEHICLE WARRANTY INSURANCE POLICY

(75) Inventors: Brock Estel Osborn, Niskayuna; John Erik Hershey, Ballton Lake, both of NY (US)

(73) Assignee: General Electric Company, Schenectady, NY (US)

(*) Notice: Under 35 U.S.C. 154(b), the term of this patent shall be extended for 0 days.

(21) Appl. No.: 09/197,755

(22) Filed: Nov. 23, 1998

(51) Int. Cl.[7] ....................................................... G06F 17/60
(52) U.S. Cl. .................................................................. 705/4
(58) Field of Search ................................... 705/4; 283/54

(56) References Cited

U.S. PATENT DOCUMENTS

| | | | | |
|---|---|---|---|---|
| 4,766,539 | * | 8/1988 | Fox ........................................... | 705/4 |
| 4,831,526 | * | 5/1989 | Luchs et al. .............................. | 705/4 |
| 4,975,840 | * | 12/1990 | DeTore et al. ........................... | 705/4 |
| 5,432,904 | * | 7/1995 | Wong ........................................ | 705/4 |
| 5,523,942 | * | 6/1996 | Tyler et al. ............................... | 705/4 |
| 5,797,134 | * | 8/1998 | McMillan ............................ | 705/400 |
| 5,809,478 | * | 9/1998 | Greco et al. .............................. | 705/4 |
| 5,839,112 | * | 11/1998 | Schreitmueller et al. ................ | 705/4 |
| 5,839,113 | * | 11/1998 | Federau et al. ........................... | 705/4 |
| 5,845,256 | * | 12/1998 | Pescitelli .................................. | 705/4 |
| 5,884,274 | * | 3/1999 | Walker et al. ............................ | 705/4 |
| 5,884,275 | * | 3/1999 | Petersen et al. .......................... | 705/7 |
| 5,893,072 | * | 4/1999 | Zizzamia .................................. | 705/4 |
| 5,970,464 | * | 10/1999 | Apte et al. ................................ | 705/4 |
| 5,978,776 | * | 11/1999 | Seretti et al. ............................ | 705/26 |

FOREIGN PATENT DOCUMENTS

WO 95/06915 * 3/1995 (WO).

OTHER PUBLICATIONS

Lyons, Lois J., "New Jersey collision rates tied to repair costs," (abstract), National Underwriter: Property/Casualty, Dec. 21, 1984, p. 8.*

"What's a Nice Car Like You Doing with a Repair Tag Like This?" (abstract), Journal of American Insurance, vol. 66, pp. 16–17, 1985.*

L. H. Crow, "Reliability Analysis for Complex, Repairable Systems", Reliability and Biometry, Statistical Analysis of Lifelength, 1974, pp. 379–410.

* cited by examiner

*Primary Examiner*—James P. Trammell
*Assistant Examiner*—Nicholas D. Rosen
(74) *Attorney, Agent, or Firm*—Dave C. Goldman; Jill M. Breedlove (57) ABSTRACT

A system and method for automated risk-based pricing of a vehicle-warranty insurance policy. A vehicle warranty policy request input source receives a request for a vehicle warranty policy. A processor receives the request and uses analytical tools in conjunction with an environmental database, a vehicle database, and a historical database, to service the request. The processor generates a price, conditions and terms for the request using a risk-based pricing algorithm. A system operator reviews the price, conditions and terms and either accepts or rejects the policy request. The system operator also has the option to adjust the price, conditions and terms derived from the processor.

66 Claims, 11 Drawing Sheets fig. 1

| STATE/CITY | $T_{MAX}$ | $T_{MIN}$ | S&S | RH | DD | PRECIP | F | E |
|---|---|---|---|---|---|---|---|---|
| AL/MOBILE | 90 | 43 | 0.3 | 59 | 1612 | 67.57 | 15 | 211 |
| CT/HARTFORD | 86 | 18 | 40.0 | 56 | 6068 | 40.48 | 120 | 169 |
| DE/WILMINGTON | 87 | 26 | 15.1 | 54 | 4910 | 44.50 | 100 | 78 |
| DC/WASHINGTON | 87 | 29 | 19.5 | 51 | 4258 | 41.44 | 82 | 72 |
| MD/BALTIMORE | 87 | 26 | 15.1 | 54 | 4787 | 42.59 | 95 | 146 |
| GA/ATLANTA | 87 | 37 | 1.8 | 57 | 2983 | 47.14 | 61 | 1010 |
| IL/CHICAGO | 84 | 19 | 38.3 | 58 | 6155 | 38.18 | 117 | 607 |
| IN/INDIANAPOLIS | 88 | 21 | 75.4 | 60 | 5611 | 39.69 | 121 | 793 |
| KY/LOUISVILLE | 89 | 26 | 13.4 | 57 | 4439 | 41.47 | 76 | 474 |
| ME/PORTLAND | 80 | 12 | 75.4 | 60 | 7511 | 42.85 | 161 | 43 |
| MA/BOSTON | 82 | 30 | 41.7 | 58 | 5634 | 42.77 | 99 | 15 |
| MI/DETROIT | 85 | 19 | 37 | 60 | 6293 | 30.80 | 143 | 633 |
| MS/JACKSON | 94 | 38 | 1.5 | 54 | 2202 | 50.86 | 36 | 305 |
| NH/CONCORD | 83 | 9 | 68.2 | 53 | 7612 | 37.23 | 154 | 339 |
| NJ/NEWARK | 86 | 25 | 29.7 | 53 | 5067 | 42.38 | 94 | 7 |
| NY/NEW YORK | 85 | 28 | 28.6 | 53 | 48.11 | 44.22 | 78 | 11 |
| NC/CHARLOTTE | 89 | 34 | 5.4 | 53 | 3191 | 43.38 | 76 | 736 |
| OH/CLEVELAND | 85 | 21 | 52.5 | 60 | 6006 | 32.08 | 119 | 787 |
| PA/PHILADELPHIA | 86 | 24 | 21.6 | 53 | 5101 | 42.48 | 108 | 5 |
| RI/PROVIDENCE | 80 | 21 | 33 | 56 | 6125 | 39.63 | 108 | 55 |
| SC/CHARLESTON | 89 | 38 | 0.3 | 56 | 2033 | 49.16 | 37 | 40 |
| TN/MEMPHIS | 91 | 33 | 5.1 | 57 | 3137 | 49.42 | 45 | 263 |
| VT/BURLINGTON | 82 | 8 | 64.3 | 60 | 7865 | 32.22 | 154 | 331 |
| VA/RICHMOND | 89 | 29 | 14.7 | 53 | 3865 | 44.21 | 86 | 164 |
| WV/CHARLESTON | 87 | 27 | 16.8 | 54 | 4417 | 45.00 | 97 | 950 |
| WI/MILWAUKEE | 81 | 15 | 39.1 | 62 | 7205 | 27.57 | 139 | 672 |
| FL/MIAMI | 90 | 58 | 0 | 61 | 214 | 59.76 | 0 | 7 |

*fig. 3a*

| STATE/CITY | $T_{MAX}$ | $T_{MIN}$ | S&S | RH | DD | PRECIP | F | E |
|---|---|---|---|---|---|---|---|---|
| AK/ANCHORAGE | 66 | 4 | 76.4 | 63 | 10684 | 14.71 | 189 | 114 |
| AZ/PHOENIX | 105 | 35 | 0 | 32 | 1765 | 7.20 | 15 | 1117 |
| AR/LITTLE ROCK | 93 | 31 | 5.7 | 56 | 3219 | 48.66 | 68 | 257 |
| CA/LOS ANGELES | 76 | 45 | 0 | 61 | 1799 | 12.63 | 0 | 97 |
| CO/DENVER | 88 | 15 | 58.3 | 39 | 6283 | 14.81 | 162 | 5283 |
| ID/BOISE | 91 | 22 | 21.4 | 53 | 5809 | 11.43 | 127 | 2838 |
| IA/DES MOINES | 87 | 11 | 32.7 | 64 | 6808 | 30.37 | 140 | 938 |
| KS/WICHITA | 92 | 23 | 7.7 | 50 | 4571 | 30.30 | 113 | 121 |
| LA/NEW ORLEANS | 91 | 48 | 0.2 | 62 | 1175 | 63.54 | 4 | 9 |
| MN/MINN.-St. P. | 84 | 2 | 44.9 | 61 | 8382 | 24.78 | 159 | 834 |
| MO/St. LOUIS | 89 | 24 | 17.2 | 56 | 4900 | 35.31 | 106 | 535 |
| MT/HELENA | 84 | 8 | 49.3 | 53 | 8129 | 10.85 | 188 | 3828 |
| NE/OMAHA | 89 | 14 | 31.3 | 58 | 6160 | 25.90 | 136 | 978 |
| NV/LAS VEGAS | 105 | 33 | 1.2 | 25 | 2425 | 4.35 | 58 | 2162 |
| NM/ALBUQUERQUE | 91 | 24 | 9.7 | 37 | 4348 | 8.13 | 120 | 5311 |
| ND/BISMARK | 86 | -2 | 36.9 | 59 | 9033 | 15.40 | 186 | 1650 |
| OK/OK. CITY | 94 | 28 | 9.5 | 55 | 3725 | 30.82 | 83 | 1285 |
| OR/PORTLAND | 79 | 35 | 9.2 | 73 | 4143 | 39.91 | 22 | 30 |
| SD/SIOUX FALLS | 88 | 4 | 42.7 | 56 | 7848 | 25.24 | 169 | 1420 |
| TX/HOUSTON | 93 | 44 | .04 | 60 | 1396 | 45.95 | 13 | 50 |
| UT/SALT LAKE | 92 | 17 | 51.6 | 46 | 5866 | 14.74 | 133 | 4220 |
| WA/SEA.-TAC. | 76 | 33 | 14.0 | 76 | 5145 | 38.94 | 40 | 386 |
| WY/CHEYENNE | 83 | 14 | 58.1 | 43 | 7562 | 16.25 | 179 | 6131 |
| HI/HONULULU | 85 | 66 | 0 | 58 | 0 | 21.89 | 0 | 7 |

*fig. 3b* fig. 4

| EASTERN STATE | NUMBER OF CONTRACTS | AVERAGE NUMBER OF ICC CLAIMS PER CONTRACT |
|---|---|---|
| AL | 181 | 0.39227 |
| DE | 49 | 0.26531 |
| MD | 303 | 0.23762 |
| FL | 1233 | 0.62612 |
| GA | 732 | 0.29781 |
| IL | 1810 | 0.15912 |
| IN | 1697 | 0.15439 |
| KY | 1406 | 0.23969 |
| MA | 166 | 0.09639 |
| MI | 898 | 0.16258 |
| MS | 40 | 0.25000 |
| NH | 77 | 0.15584 |
| NJ | 216 | 0.16204 |
| NY | 313 | 0.14377 |
| NC | 1090 | 0.19174 |
| OH | 924 | 0.25108 |
| PA | 1072 | 0.15578 |
| RI | 12 | 0.0 |
| SC | 1402 | 0.27033 |
| TN | 816 | 0.25980 |
| VA | 2599 | 0.19007 |
| WV | 24 | 0.0 |
| WI | 901 | 0.1576 |

*fig. 5a*

| WESTERN STATE | NUMBER OF CONTRACTS | AVERAGE NUMBER OF ICC CLAIMS PER CONTRACT |
| --- | --- | --- |
| AK | 366 | 0.09290 |
| AZ | 1361 | 0.40999 |
| AR | 485 | 0.46392 |
| CA | 8511 | 0.20432 |
| CO | 2269 | 0.10269 |
| HI | 2736 | 0.60051 |
| ID | 1739 | 0.15170 |
| IA | 529 | 0.24934 |
| KS | 58 | 0.27586 |
| LA | 32 | 0.40625 |
| MN | 538 | 0.17472 |
| MO | 315 | 0.20317 |
| MT | 159 | 0.12579 |
| NE | 1 | 0.0 |
| NV | 1652 | 0.29385 |
| NM | 156 | 0.17308 |
| ND | 49 | 0.10204 |
| OK | 1736 | 0.25749 |
| OR | 1501 | 0.14324 |
| SD | 80 | 0.08750 |
| TX | 1616 | 0.37995 |
| UT | 2055 | 0.15766 |
| WA | 3559 | 0.15426 |
| WY | 199 | 0.16080 |

*fig. 5b* fig. 6 fig. 7 fig. 8 fig. 9

SYSTEM AND METHOD FOR AUTOMATED RISK-BASED PRICING OF A VEHICLE WARRANTY INSURANCE POLICY

BACKGROUND OF THE INVENTION

This invention relates generally to vehicle warranty insurance policy preparation and sale and more particularly to a system and method for automated risk-based pricing of such policies.

Typically, vehicle warranty insurance policy pricing, preparation and sale involve assessing the expected lifetime cost of an issued policy for a particular vehicle. The expected cost is generally determined as a function of several variables such as the make, model and year of the vehicle as well as the mileage of the vehicle at the time of submitting an application for a vehicle warranty insurance policy. This expected cost determination is mathematically complex and requires a sophisticated computational capability in order to perform the relevant calculations.

In addition to being mathematically complex, the above-described expected cost determination is not very competitive for the vehicle warranty insurer. In particular, the current expected cost determination does not spread the costs uniformly amongst its customers, which results in low risk customers being overcharged, while high risk customers are undercharged. The market response is that the population of high risk customers will increase because they are undercharged and the population of low risk customers will decrease because they are overcharged. In order to remain competitive, the vehicle warranty insurer must try to readjust the prices charged to compensate for the undercharged high risk customers. Generally, the vehicle warranty insurer will try to readjust the average price charged by implementing a uniform price increase. This causes a decrease in the amount of high risk customers, however, readjusting the average price causes the low risk customer to be overcharged even more. Another alternative for the vehicle warranty insurer is to simply eliminate the entire population of high risk customers, however, this also results in a imbalance of low risk and high risk customers. The vehicle warranty insurer cannot be competitive with either of these approaches because it cannot grow its business. Eventually, the vehicle warranty insurer will lose its market share and may even go bankrupt.

Therefore, there is a need for a system and method that can price vehicle warranty insurance policies that vary for low and high risk customers so that a vehicle warranty insurer can increase its business. Also, this system and method must be easy to use so that the vehicle warranty insurance personnel can understand and use it.

BRIEF SUMMARY OF THE INVENTION

This invention is able to provide a system and method that can price vehicle warranty insurance policies that vary for low and high risk customers so that a vehicle warranty insurer can increase its business by using a risk-based pricing technique that takes into account other variables besides the make, model and year of the vehicle as well as the mileage of the vehicle, such as geographic and environmental factors where the vehicle is operated. For example, risk-based pricing might charge more for a significantly driven vehicle than a vehicle which has driven far fewer miles. Risk-based pricing might also charge more for a vehicle operated in one particular geographic region versus another region because of expected losses in that region.

In a first embodiment of this invention there is a system for performing risk-based pricing of a vehicle warranty insurance policy. In this embodiment, there is a vehicle warranty policy request input source that receives a request for a vehicle warranty policy. A historical database contains a plurality of historical vehicle warranty policies. A plurality of databases each contain vehicle warranty related information. A processor, coupled to the vehicle warranty policy request input source, the historical database, and the plurality of databases, services the request for a vehicle warranty policy. The processor comprises a means for risk-based pricing the request and a means for suggesting terms and conditions for the risk-based priced policy. A vehicle warranty policy output source, coupled to the processor, outputs the serviced request for a vehicle warranty policy.

In a second embodiment of this invention there is a method for performing risk-based pricing of a vehicle warranty insurance policy. In this embodiment, a request for a vehicle warranty policy is received. A plurality of historical vehicle warranty policies are stored. In addition, a plurality of vehicle warranty related information are stored. The vehicle warranty policy request is risk-based priced after being received. In addition, terms and conditions are suggested for the risk-based price vehicle warranty policy request. The price and the suggested terms and conditions for the vehicle warranty policy request are then outputted.

DETAILED DESCRIPTION OF THE INVENTION

Figure 1:
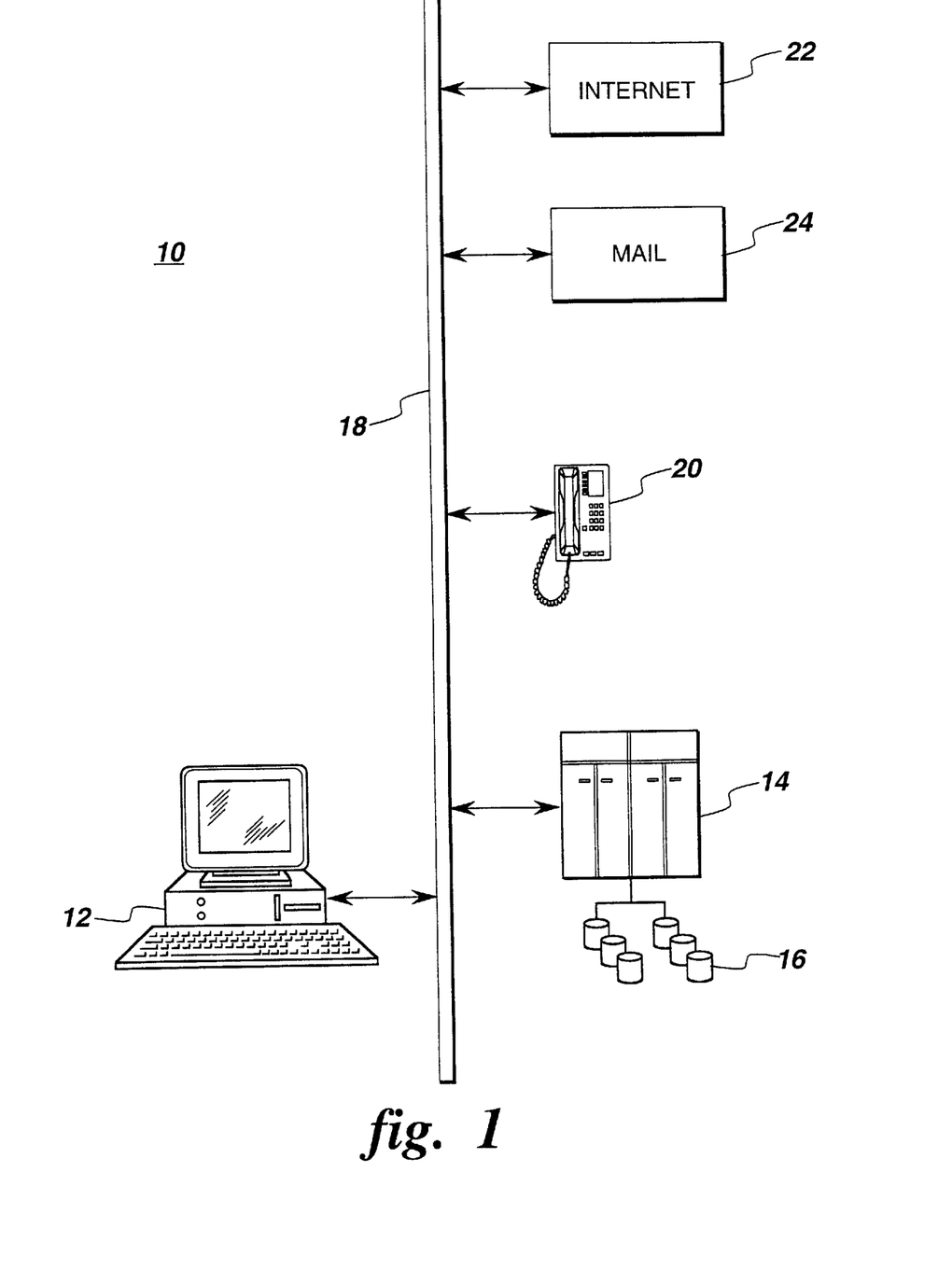
FIG. 1 shows a schematic of an automated risk-based pricing system for a vehicle warranty insurance policy according to this invention.

FIG. 1 shows a schematic of an automated risk-based pricing system 10 for a vehicle warranty insurance policy according to this invention. The automated risk-based pricing system 10 includes a workstation or personal computer 12, a multi-task processor 14, and large volumes of data 16 stored in memory units. The computer 12 and the processor 14 are connected together by a network 18. The processor 14 receives a request for a vehicle warranty policy from a customer for a particular vehicle. The request comprises vehicle information from the customer such as the vehicle make, vehicle model, vehicle year, vehicle identification number (VIN), region in which the vehicle is operated and vehicle mileage. The processor 14 receives the request via an electronic channel such as the telephone 20 or the Internet 22. The processor 14 may also receive the request by the mail 24, wherein the vehicle information is entered into the system 10 by using conventional data entry techniques. In addition to using the mail, the customer may send a facsimile of the request. After receiving the request, the processor then services the request. Servicing the request comprises pricing a policy for the request and suggesting terms and conditions for the priced policy.

A system operator working on the computer 12 reviews the priced policy and the suggested terms and conditions. If the suggested price and terms and conditions are acceptable, then the system operator offers the policy and communicates it to the customer. However, if the suggested price and terms and conditions are unacceptable, then the system operator has the option of overriding the priced policy and manually entering a modified policy. The system operator can then communicate this policy to the customer. Alternatively, the system operator may reject the suggested price and terms and conditions of the policy determined by the processor 44 and notify the customer.

Figure 2:
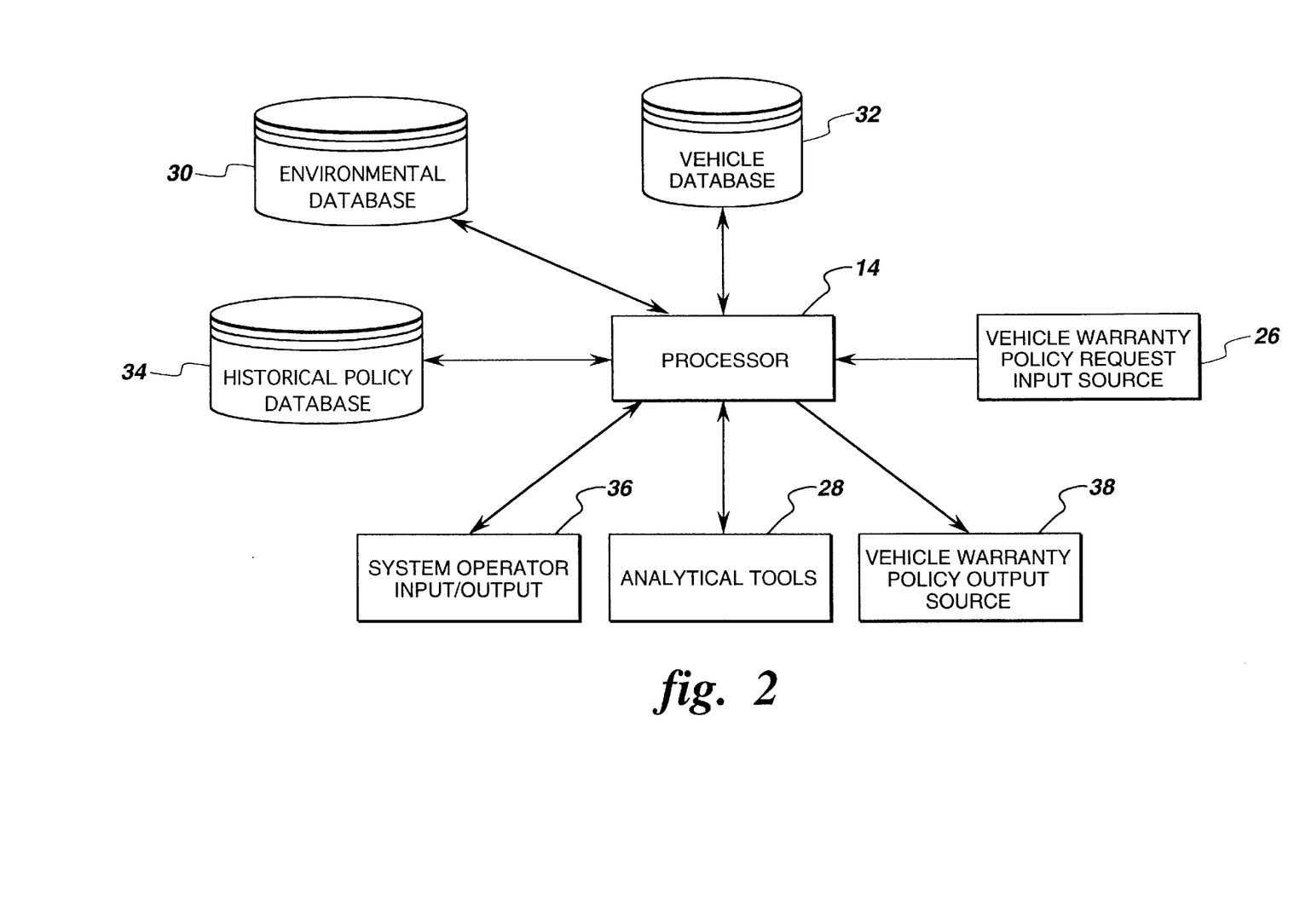
FIG. 2 shows a block diagram of the processing architecture of the automated risk-based pricing system according to this invention.

FIG. 2 shows a block diagram of the processing architecture of the automated risk-based pricing system 10. In the processing architecture there is a vehicle warranty policy request input source 26 that receives the request for a vehicle warranty policy. The vehicle warranty policy request input source 26 may be via the telephone 20, Internet 22 or mail 24. For requests submitted via the telephone, one alternative is to use a public switched telephone network (PSTN), wherein the vehicle warranty policy request is handled by a telephone operator upon successful connection. The telephone operator enters the vehicle information according to a menu or template. Another alternative for the telephone is to use a voice activated network wherein a voice synthesizer generates a facsimile of speech guiding a customer to prepare the request and a speech recognition system recognizes the aural responses generated from the customer. A third alternative is to use a voice mail network wherein a voice synthesizer generates a facsimile of speech guiding a customer to prepare the request and a recognition system recognizes responses entered by the customer through key buttons on a dual tone multi-frequency telephone(DTMF).

The processor 14 receives the request from the input source 26 and uses a risk-based pricing algorithm obtained from an analytical tools unit 28 to determine a price for the request, as well as suggest terms and conditions for the priced policy. Using the risk-based pricing algorithm, which is described below in more detail, the processor 14 partitions the vehicle listed in the request into a plurality of components that comprise its assembly. For instance, some of the major systems that form the vehicle's assembly are the braking system, the engine system, the interior climate and comfort system, the electrical system, and the exhaust system. These systems are only illustrative of some the systems that comprise a vehicle and are not meant to limit this invention.

The processor 14 determines a correlation between the failure rates of each of the plurality of components and costs to repair the failed component with vehicle warranty related information contained in the plurality of databases 16 using various evaluation applications obtained from the analytical tools unit 28. As shown in FIG. 2, the databases comprise an environmental database 30 and a vehicle database 32. The environmental database 30 contains environmental information for various geographic regions and the vehicle database 32 contains information on a variety of vehicles. In particular, the environmental database contains environmental data derived from the Water Information Center, Inc., entitled *Climates of the States* (1974), which is incorporated herein by reference and the vehicle database 32 contains information obtained from various commercial organizations such as J. D. Powers and Consumer Reports incorporated.

Figure 3A:
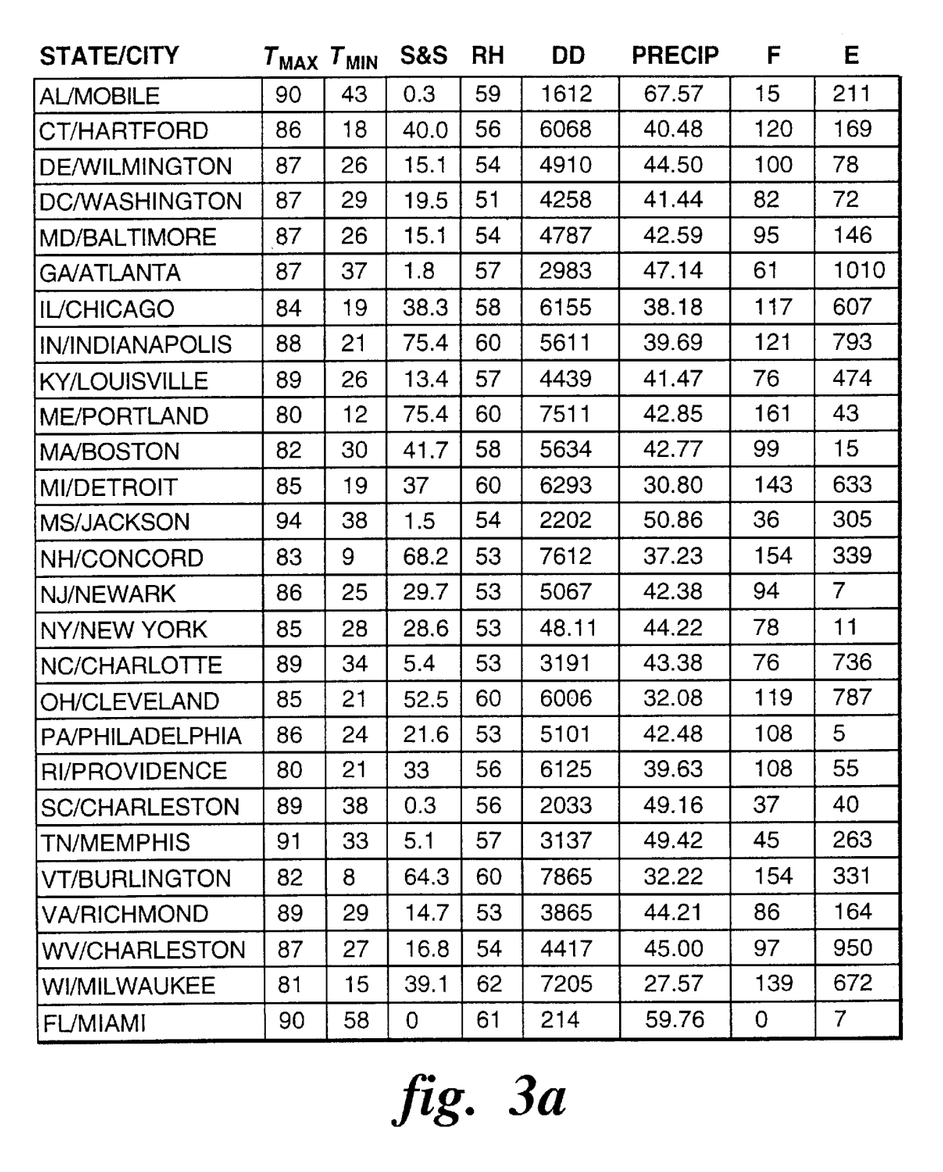
FIGS. 3a–3b shows examples of environmental data stored in the environmental database shown in FIG. 2 according to this invention.
Figure 3B:
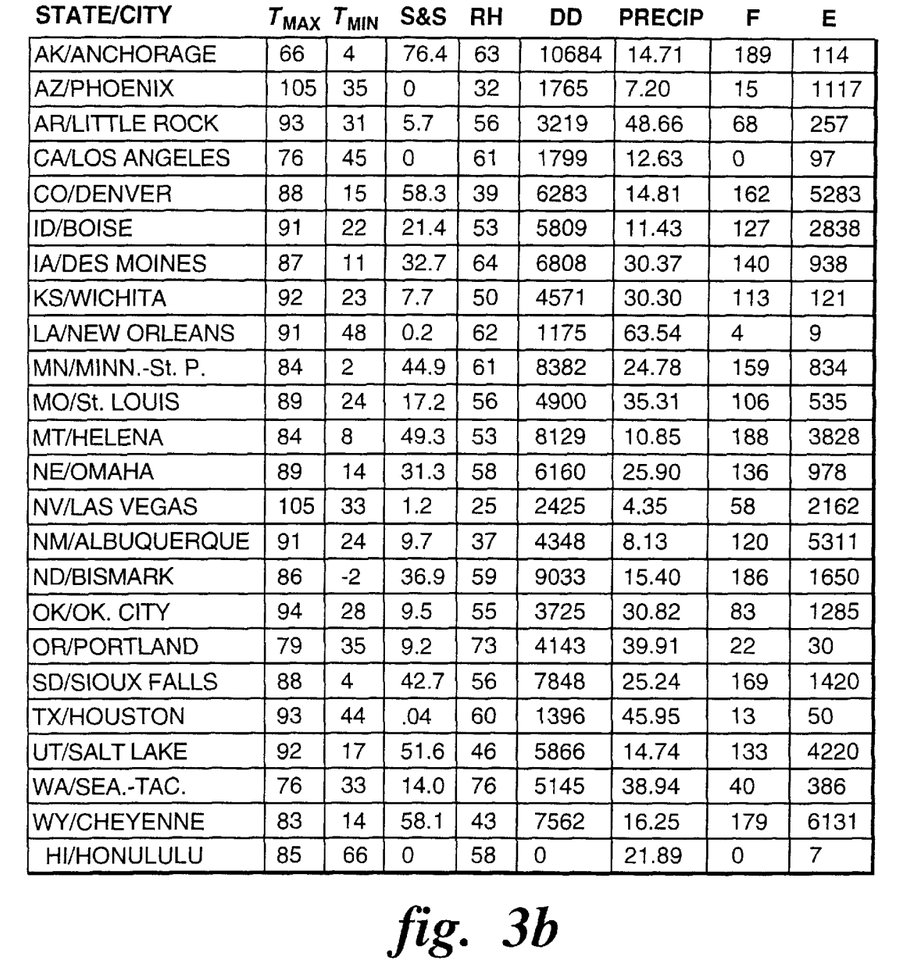

FIGS. 3a–3b show some of the environmental data obtained from Water Information Center, Inc. In particular, FIGS. 3a–3b show environmental data for cities in each of the fifty states in the United States. The environmental data includes the maximum of average monthly maximum temperature in that city ($T_{max}$), minimum of average monthly minimum temperature in that city ($T_{min}$), yearly average snow and sleet accumulation in inches (S&S), average relative humidity percentage (RH) near mid-day in that city, normal degree days (DD) in that city, yearly average total precipitation in inches in that city (Precip), average number of days in year for which the minimum temperature is $\leq 32°$ F. (F) in that city, and the elevation above sea level in feet for that city (E). The environmental database 30 may contain other types of environmental data and is not limited to the data shown in FIGS. 3a–3b.

Referring back to FIG. 2, the processor 14 uses each correlation to derive an expected cost of policy claims for the vehicle described in the request. The processor 14 uses tools from the analytical tools unit 28 to search a historical policy database 34 that contains a plurality of historical vehicle warranty policies for historical vehicle warranty policies that are substantially similar to the policy request. The processor 14 compares the derived expected cost of the policy request to the actual incurred costs of the similar historical vehicle warranty policies. If the expected cost is consistent with the historical data, then the processor 14 uses the derived expected cost. However, if the expected cost is not consistent with the historical data, then the processor 14 adjusts the derived expected cost to the historical policies. After checking the derived expected cost with the historical policies, the processor 14 then sets a policy proffer price along with suggested terms and conditions.

The system operator working on the computer 12 reviews the priced policy and the suggested terms and conditions via a system operator input/output 36. As mentioned above, the system operator reviews the suggested price and terms and conditions to determine if they are acceptable. If the suggested price and terms and conditions are unacceptable, then the system operator may use the system operator input/output 36 to override the priced policy and manually enter a modified priced policy with terms and conditions. The system operator then offers the modified policy to the customer through a vehicle warranty policy output source 38. If the suggested price and terms and conditions are acceptable, then the system operator communicates the policy to the customer via the vehicle warranty policy output source 38. Like the vehicle warranty policy request input source 26, the output source 38 may comprise channels of communication such as the telephone, the Internet or the mail.

Figure 4:
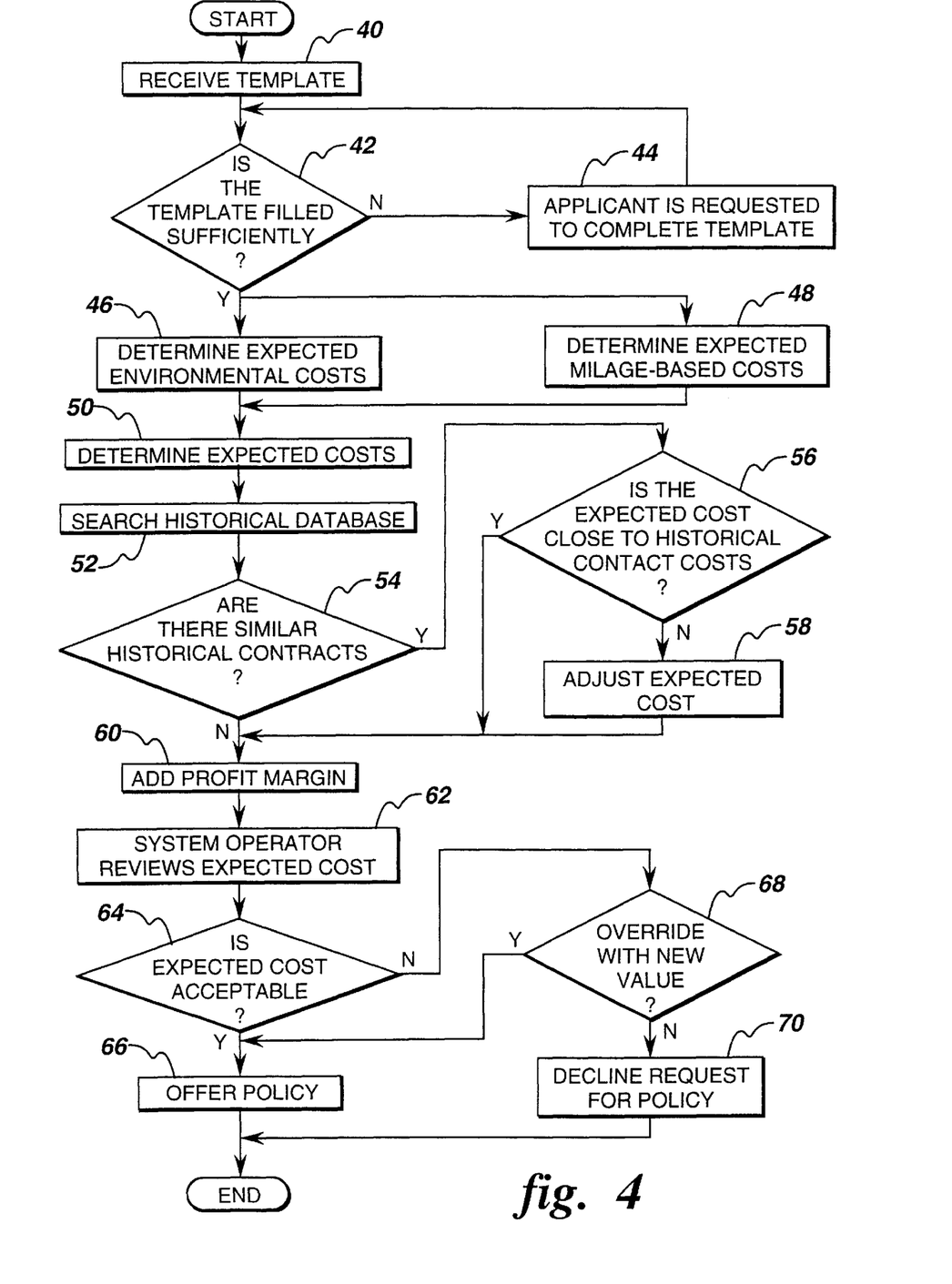
FIG. 4 shows a flow chart setting forth steps performed in a risk-based pricing algorithm used in this invention.

FIG. 4 shows a flow chart setting forth the steps performed in the risk-based pricing algorithm. At block 40, the processor receives the request which includes the template prepared by the customer for the vehicle warranty insurance policy. The template includes items entered by the customer such as the vehicle make, model and year, the odometer reading of the vehicle at the time of application, the geographical area in which the insured vehicle will be primarily operated, the VIN, the type of contract desired and items to be covered. The template also includes customer particulars such as their address, phone number and payment instrument.

Next, the processor reviews the template at 42 to determine if all of the necessary information is present in the template. If an item of information is not present, then the customer is notified and requested to provide the missing data at 44 before further processing is continued. After the processor determines that the template is complete, then it begins the expected cost determination for the applicant's vehicle. The processor begins the expected cost determination by partitioning the applicant's vehicle into a plurality of components (e.g., the braking system, the engine system, the interior climate and comfort system, the electrical system, the exhaust system etc.).

This invention partitions the vehicle into a plurality of components because it can be shown that there is a correlation between the components of the vehicle and environmental data with the number of warranty claims. For example, consider the interior climate and comfort (ICC) system of a vehicle. This invention subsumes that the ICC system includes the compressor, compressor mounting bracket, clutch and pulley, orifice tube, condensor, heater core, heater control valve, receiver/dryer, evaporator, air duct and outlets, accumulator, air conditioning temperature control program, and seals and gaskets.

Figure 5A:
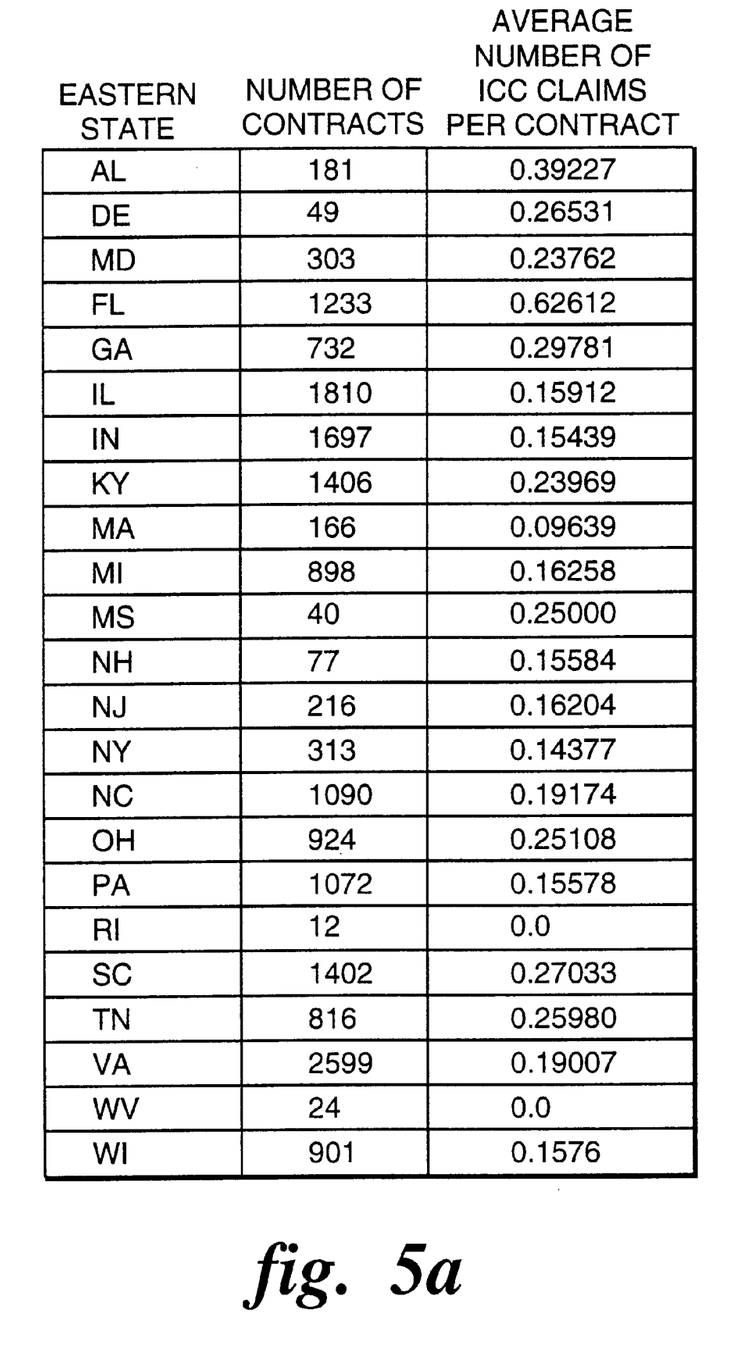
FIGS. 5a–5b show an example of a history of vehicle warranty claims for the interior climate and comfort (ICC) system of a vehicle made on a nationwide state-by-state basis.
Figure 5B:
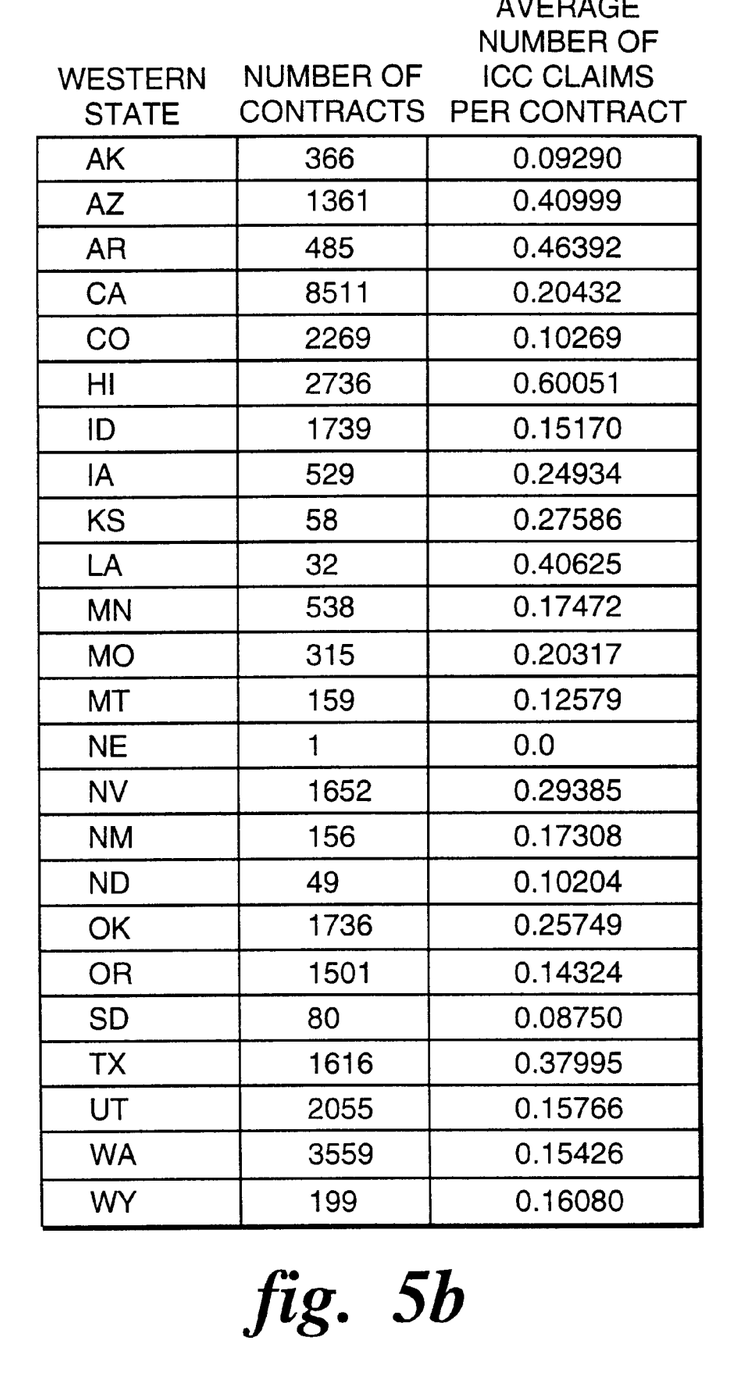

A history of ICC claims on a nationwide state-by-state database of closed vehicle warranty policy contracts is shown in FIGS. 5a–5b. Using techniques of multivariate linear regression, as described, for example, in Johnson et al., *Applied Multivariate Statistical Analysis*, Third Edition, Prentice-Hall (1992), which is incorporated herein by reference, the dependent variables of interest can be fitted to a subset of the aforementioned eight environmental variables (i.e., $T_{max}$, $T_{min}$, S&S, RH, DD, Precip, F, and E). The equations were derived by successive weighted least square refinements by excluding independent environmental variables with p-values that are no greater than 0.01. The resulting equation for the average number of claims for ICC per policy contract is defined as:

$$ICC = \qquad (1)$$
$$-1.60 + 0.0135 \cdot t_{max} + 0.0116 \cdot t_{min} + 0.00432 \cdot RH + 0.00369 \cdot S\&S$$

Note that the ICC system component appears to be especially sensitive to temperature. This component also has a relatively high cost of repair and thus any seasonality exhibited by it could be reflected in an overall seasonality effect. Being able to accurately predict costs associated with strong seasonality behavior can be highly cost beneficial in husbanding cash reserves. As an example of such a seasonality behavior in ICC claims, consider Arizona, a state with a large seasonal temperature variation. Temperature data taken at Sky Harbor Airport in Phoenix, is displayed in Table 1.

TABLE 1

Normal Monthly Maximum Daily Temperature (° F.)

| Ja | Fe | Ma | Ap | Ma | Jn | Ju | Au | Sp | Oc | No | Dc |
|---|---|---|---|---|---|---|---|---|---|---|---|
| 64.0 | 68.1 | 75.0 | 83.9 | 92.9 | 101.6 | 104.6 | 101.6 | 98.2 | 86.7 | 73.7 | 66.1 |

For a large set of closed contracts on Arizona vehicles, the percentage of ICC claims by month is shown in Table 2.

TABLE 2

Percentage of ICC Claims by Month for Arizona

| Ja | Fe | Ma | Ap | Ma | Jn | Ju | Au | Sp | Oc | No | Dc |
|---|---|---|---|---|---|---|---|---|---|---|---|
| 1.8 | 2.2 | 5.6 | 10.4 | 13.4 | 12.7 | 16.8 | 15.8 | 9.3 | 6.8 | 3.0 | 2.2 |

Figure 6:
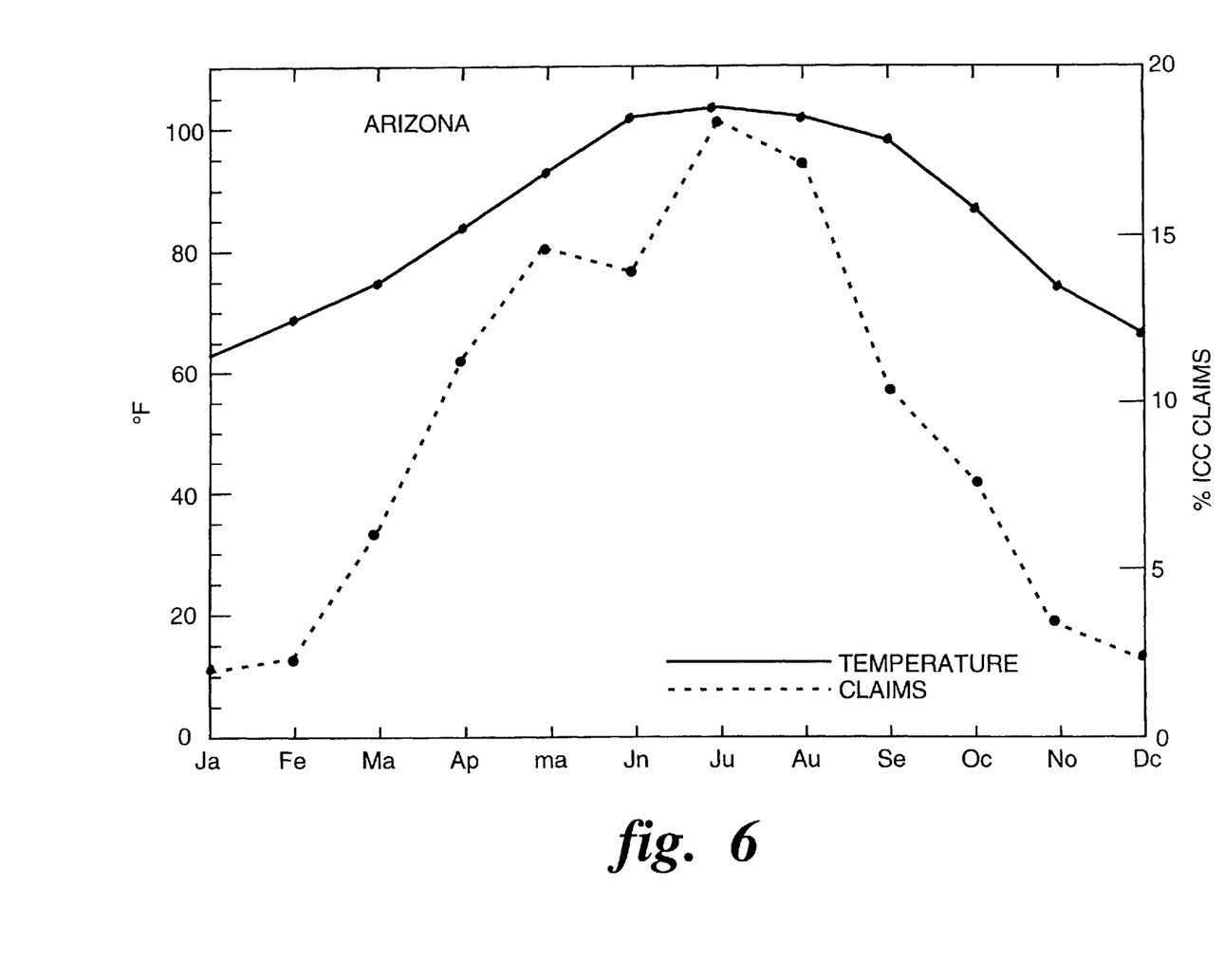
FIG. 6 shows a plot of both the normal monthly maximum daily temperature and the claim percentages versus month for the state of Arizona.

FIG. 6 shows a plot of both the normal monthly maximum daily temperature and the claim percentages versus month for the state of Arizona. The data of FIG. 6 does indeed suggest a dependency between the normal monthly maximum daily temperature and the claim probabilities. In addition, FIG. 6 shows that the specific season has an effect on the claims for Arizona. A quick assessment of the dependency can be gained by computing the linear correlation coefficient, ρ. This coefficient is defined in Press et al., *Numerical Recipes: The Art of Scientific Computing (FORTRAN Version)*, Cambridge University Press (1989), which is incorporated herein by reference. For two variables, x and y, the coefficient is defined as:

$$\rho = \frac{\sum_i (\chi_i - \overline{\chi})(y_i - \overline{y})}{\sqrt{\sum_i (\chi_i - \overline{\chi})^2} \sqrt{\sum_i (y_i - \overline{y})^2}} \qquad (2)$$

Using equation 2 with the data displayed in FIG. 6 results in a linear correlation coefficient of ρ equal to 0.939. This indicates that there is an extremely high degree of linear correlation. It is easy to verify that ρ computed for the data set {x,y} will be invariant under the transformation:

$$y \leftarrow ay+b \qquad (3)$$

in which the y variable is replaced by a non zero multiple, 'a', of itself, a scale factor, and a constant offset, 'b'. Therefore, there must exist for a simple (linear) model that will directly relate policy claims to normal monthly maximum daily temperature.

The first step is to develop a simple model for the normal maximum daily temperature. Using physics laws that describe the Earth's seasonal path about the sun, this invention postulated that the normal monthly maximum daily temperature, $T_{max}$, might be well modeled by a sine wave which is defined as:

$$T_{max} = \frac{Y_{min} + Y_{max}}{2} - \frac{Y_{min} - Y_{max}}{2}\cos\left(2\pi \cdot \frac{i}{12}\right) \qquad (4)$$

wherein i is the month (for January, i=0 and for December, i=11), $T_{max}$ is the normal maximum daily temperature for the i-th month, $Y_{min}$ is the minimum of the normal maximum daily temperatures over the entire year, and $Y_{max}$ is the maximum of the normal maximum daily temperatures over the entire year.

Figure 7:
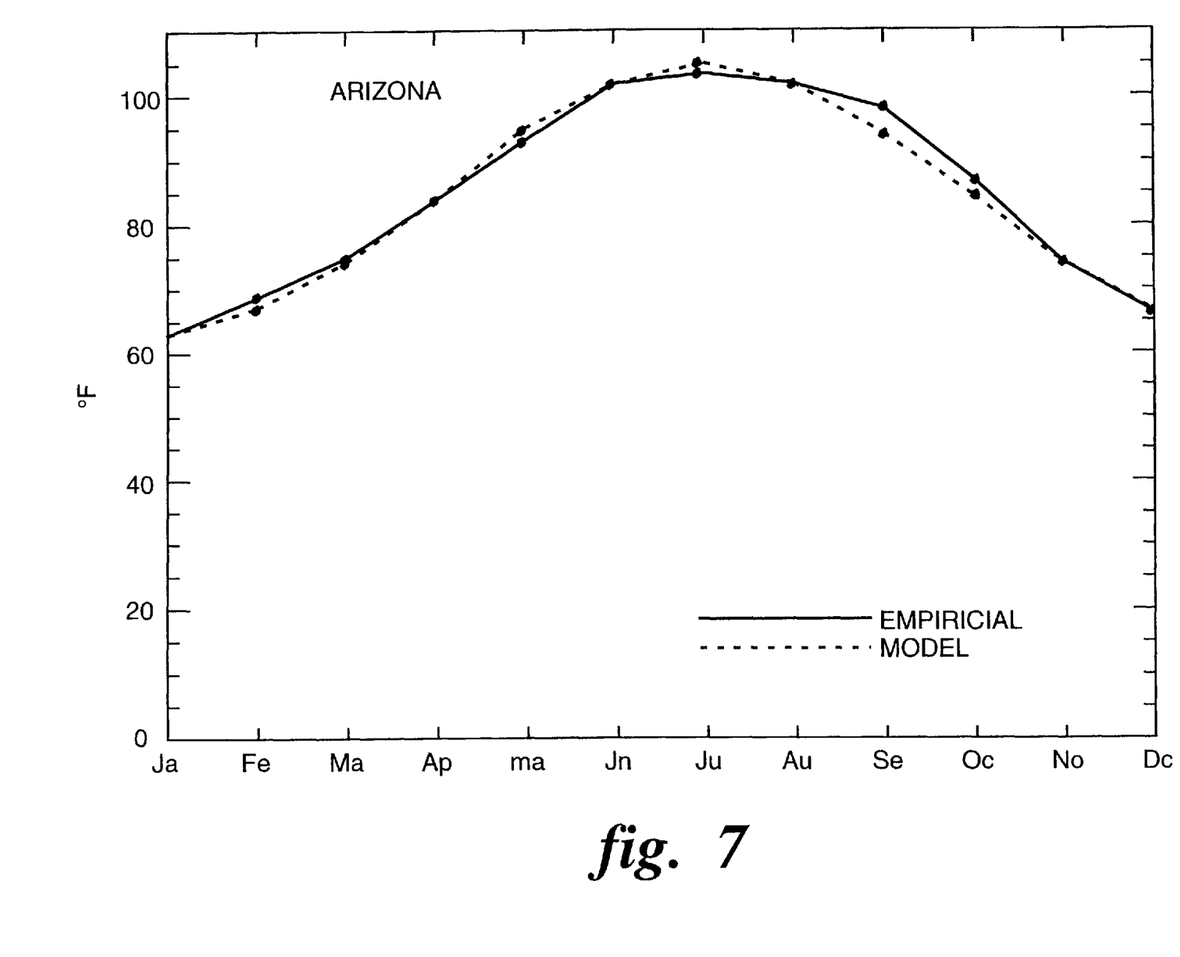
FIG. 7 shows a plot fitting a simple temperature model to the temperature data results shown in FIG. 6 according to this invention.
Figure 8:
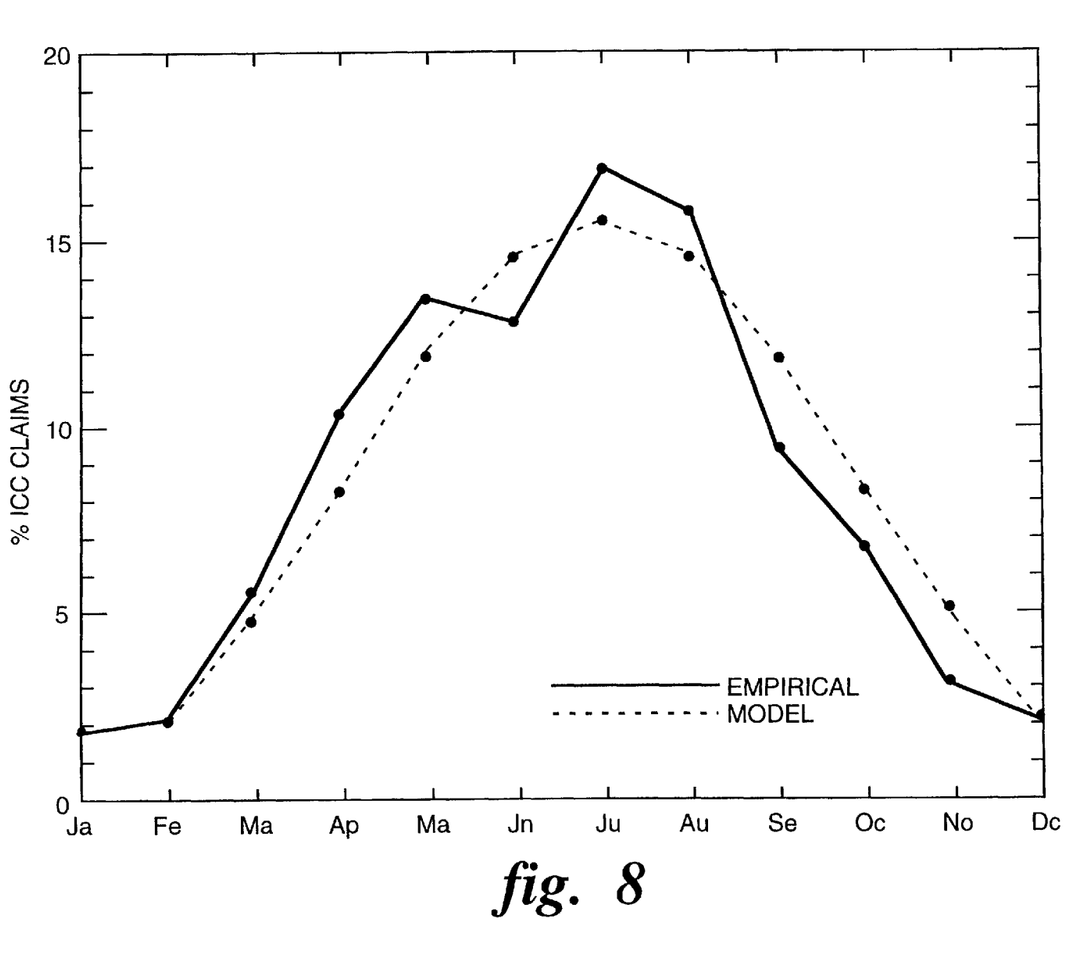
FIG. 8 shows a plot of the predicted percentage of vehicle warranty insurance claims for the (ICC) system the in the state of Arizona by month according to this invention.

Applying the above simple temperature model to the appropriate Arizona temperature data results in a linear correlation coefficient of ρ equal to 0.995. The fit of the temperature model is shown in FIG. 7. Using the model for maximum monthly temperature, it can be tied into a claims predictor. If $C_i$ is the actual percentage of claims in a particular state in the i-th month then:

$$\hat{C}_i = a + b\left[\frac{Y_{min} + Y_{max}}{2} - \frac{Y_{min} - Y_{max}}{2}\cos\left(2\pi \cdot \frac{i}{12}\right)\right] \qquad (5)$$

wherein $\hat{C}_i$ is the estimated percentage of claims in the i-th month and a and b are constants which will be a function of the specific state. FIG. 8 shows the data of the predicted percentage of ICC claims for the state of Arizona by month after doing a least squares fit. The predictor and the data in FIG. 8 achieve a linear correlation coefficient of ρ equal to 0.922. Other correlations having similar analysis can be performed for the other vehicle components.

Likewise, similar analysis can be performed for the components of a car based on mileage based contract claims. For example, a Repairable System Model for projecting auto warranty claims can be used. Repairable system models were first developed by L. H. Crow in 1974 and further developed by Basu and Rigdon. When applied to auto warranty contracts, the time interval (a,b) when the contract exists where time is measured either in days or in miles is considered. The probability density function that the automobile experiences N claims at times $(t_1, t_2, \ldots, t_N)$ is given by:

$$f(t_1, t_2, \ldots, t_N) = \exp\left[-\left(\frac{b}{\theta}\right)^\beta + \left(\frac{a}{\theta}\right)^\beta\right] \times \prod_{i=1}^{N}\left(\frac{\beta}{\theta}\right)\left(\frac{t_i}{\theta}\right)^{\beta-1} \qquad (6)$$

Figure 9:
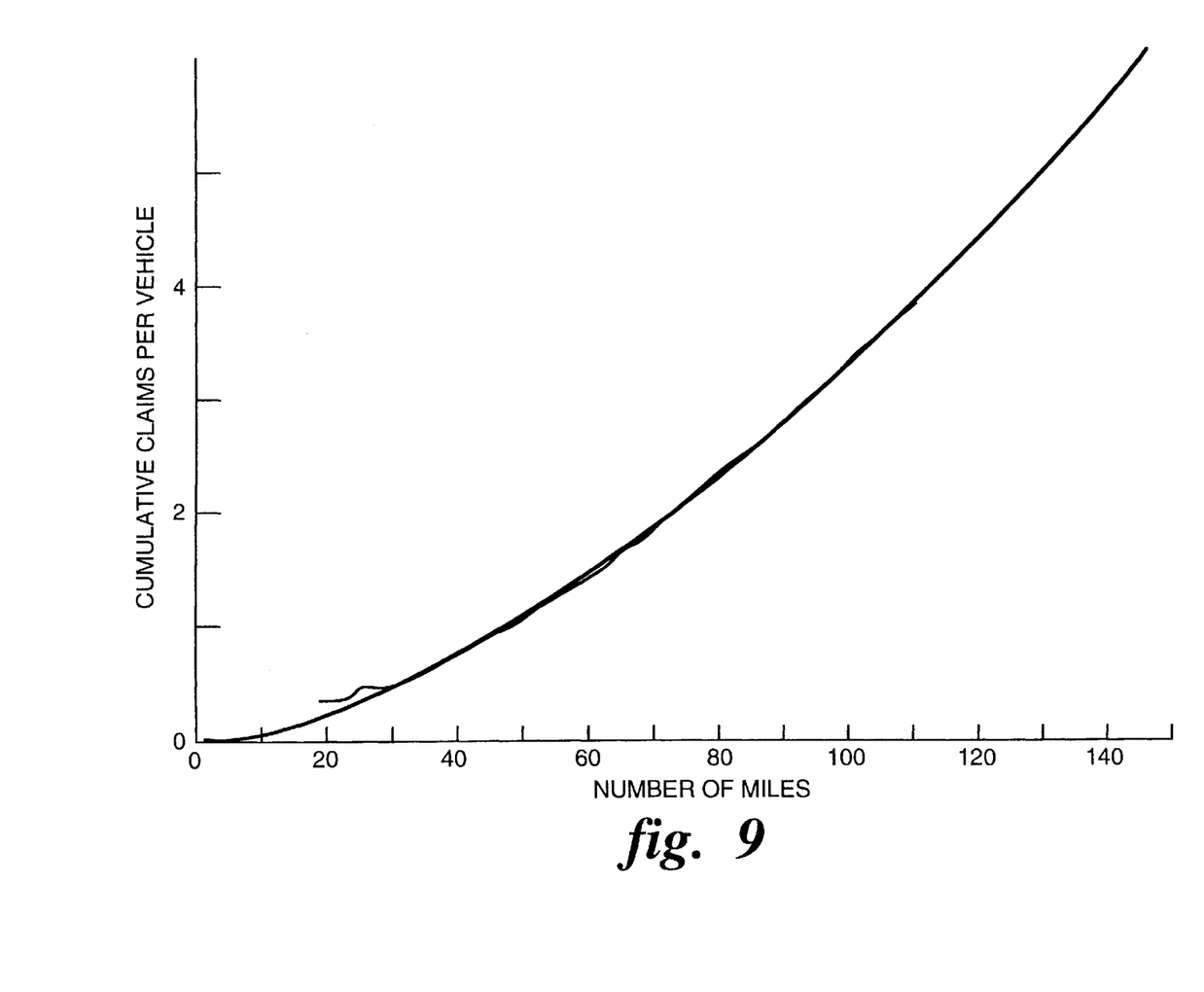
FIG. 9 shows a plot of historical 12 month/12,000 miles contract claims along with projected contract claims for vehicles having odometer mileage greater than 1000 miles and under 10 years old according to this invention.

The parameters β and θ can be estimated using the standard technique of maximum likelihood. When this technique was applied to 5,532 12 month, 12,000 mile contracts, and time was measured in miles, the resulting parameters were found to be: β=1.58 and θ=47552. The quantity $$H(t) = \left(\frac{t}{\theta}\right)^\beta$$

gives the resulting expected number of cumulative claims per vehicle by mile. This curve is plotted in FIG. 9 along with the corresponding empirical curve calculated directly from the data according to the formula:

$$\hat{H}(t_{i+1}) = \hat{H}(t_i) + \hat{h}(t_{i+1}) \times (t_{i+1} - t_i) \qquad (7)$$

where for each specific mileage at which a failure occurred, the following is calculated:

$$\hat{h}(t_i) = \frac{\text{total number of failures at mileage } t_i}{\text{total number of contracts existing at mileage } t_i} \qquad (8)$$

The initial point, $\hat{H}(0)$ was chosen to minimize the mean squared error:

$$\sum_i \left(\left[H(t_i) - \hat{H}(t_i)\right]\right)^2 \qquad (9)$$

Referring back to FIG. 4, for each partitioned component, the processor determines the expected environmental costs ($E) and the expected mileage based costs ($M) of the policy contract at 46 and 48, respectively. The expected environmental costs ($E) and the expected mileage based costs ($M) for each of the partitioned components are aggregated into one value at blocks 46 and 48, respectively.

The processor then determines the expected weighted cost, ($C), from the expected environmental costs ($E) and the expected mileage costs ($M) at 50. The expected weight cost ($C) is defined as:

$$C = \alpha_1 E + \alpha_2 M \qquad (10)$$

wherein $\alpha_1$ and $\alpha_2$ are numerical coefficients or "weights" specified externally by the system operator. The processor then searches the historical policy database 34 at block 52 for historical vehicle warranty policies that are substantially similar to the policy request. If there are substantially similar historical policies as determined at 54, then the processor 14 compares the derived expected cost of the policy request to the actual incurred costs of the similar historical vehicle warranty policies at 56. The threshold to determine if the costs between the derived expected cost ($C) and the previously incurred costs of the historical policy contracts is set by the system operator. If the expected cost is not consistent with the historical data, then the processor 14 adjusts the derived expected cost to the historical policies at 58. The expected cost ($C) is adjusted according to the following step:

$$C \leftarrow (1-\alpha_3)C + \alpha_3(H-C) \qquad (11)$$

where H is the average historical cost for the similar historical policy contracts and $\alpha_3$ is a numerical coefficient or weight entered by the system operator.

If there are no substantially similar historical policy contracts as determined at 54 or if the expected costs ($C) is in conformance with the historical policy contracts as determined at 56, then processing continues at 60 where the processor adds the profit margin to the derived expected cost. The profit margin is added to the expected cost using the following step:

$$C \leftarrow C + P \qquad (12)$$

where P is the profit margin which is specified externally. The processor then sends the derived expected cost with profit margin along with terms and conditions for a policy to the system operator at 62 for review. If the system operator approves the suggested price at 64, then the contract is offered to the potential customer at 66. However, if the system operator does not approve the suggested contract price at 64, then the system operator may override the suggested price with a manually entered price as indicated at 68 and offer the modified policy at 66. If the system operator decides at 68 not to modify the price of the policy, then the potential customer's request for coverage is rejected at 70.

It is therefore apparent that there has been provided in accordance with the present invention, a system and method for risk-based pricing of a vehicle warranty insurance policy that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for performing risk-based pricing of a vehicle warranty insurance policy, comprising:
    a vehicle warranty policy request input source for receiving a request for a vehicle warranty policy;
    a historical database containing a plurality of historical vehicle warranty policies;
    a plurality of databases each containing vehicle warranty related information;
    a processor, coupled to the vehicle warranty policy request input source, the historical database, and the plurality of databases, for servicing the request for a vehicle warranty policy, the processor comprising means for risk-based pricing the request and means for suggesting terms and conditions for the risk-based policy, wherein the risk-based pricing means partitions the vehicle listed in the request into a plurality of components, determines a correlation between failure rates of each of the plurality of components and costs to effect repair of the failed component with the vehicle warranty related information contained in the plurality of databases, derives an expected cost of policy claims from the correlations and sets a policy proffer price covering the expected cost of policy claims plus a predetermined profit margin; and
    a vehicle warranty policy output source, coupled to the processor, for outputting the serviced request for a vehicle warranty policy.

2. The system according to claim 1, wherein the vehicle warranty policy request input source comprises an electronic channel connected to the Internet.

3. The system according to claim 1, wherein the vehicle warranty policy request input source comprises an electronic channel connected to a public switched telephone network, wherein the vehicle warranty policy request is handled by a telephone operator.

4. The system according to claim 1, wherein the vehicle warranty policy request input source comprises an electronic channel connected to a voice activated network, wherein a voice synthesizer generates a facsimile of speech guiding a customer to prepare the request and a speech recognition system recognizes aural responses generated from the customer.

5. The system according to claim 1, wherein the vehicle warranty policy request input source comprises an electronic channel connected to a dual tone multi-frequency telephone network, wherein a voice synthesizer generates a facsimile of speech guiding a customer to prepare the request and a recognition system recognizes responses entered by a customer through key buttons on a dual tone multi-frequency telephone.

6. The system according to claim 1, wherein the plurality of databases comprise an environmental database containing a plurality of environmental information for geographic regions and a vehicle database containing vehicle related information.

7. The system according to claim 1, wherein the plurality of databases comprise a plurality of analytical tools.

8. The system according to claim 1, wherein the vehicle warranty related information comprises a plurality of environmental variables of a region within which the vehicle is likely to be operated over a term of the policy, make, model and year of the vehicle and the mileage of the vehicle at the time of starting the policy.

9. The system according to claim 1, wherein the pricing means searches the historical database for historical vehicle warranty policies that are substantially similar to the policy request and compares the derived expected cost of the policy request to the actual incurred costs set forth in the historical vehicle warranty policies.

10. The system according to claim 9, wherein the pricing means adjusts the derived expected cost of the policy request to conform to the actual incurred costs set forth in the historical vehicle warranty policies.

11. The system according to claim 1, wherein the vehicle warranty policy output source comprises a system operator input/output enabling a system operator to review the price, terms and conditions of the serviced policy request.

12. The system according to claim 11, wherein the system operator input/output comprises means for accepting or rejecting the price, terms and conditions of the serviced policy request and means for manually entering a modified price, terms and conditions for the policy request.

13. The system according to claim 12, wherein the vehicle warranty policy output source further comprises means for communicating to the customer of the vehicle warranty policy request whether the request has been accepted and the price, terms and conditions of the policy or whether the request has been rejected.

14. The system according to claim 1, wherein the vehicle warranty policy output source comprises an electronic channel connected to the Internet.

15. The system according to claim 1, wherein the vehicle warranty policy output source comprises an electronic channel connected to a public switched telephone network, wherein the serviced request is communicated to a customer by a telephone operator.

16. The system according to claim 1, wherein the vehicle warranty policy output source comprises an electronic channel connected to a voice activated network, wherein a voice synthesizer generates a facsimile of speech communicating the results of the serviced request to a customer.

17. A method for performing risk-based pricing of a vehicle warranty insurance policy, comprising:
    receiving a request for a vehicle warranty policy;
    storing a plurality of historical vehicle warranty policies;
    storing a plurality of vehicle warranty related information;
    risk-based pricing the vehicle warranty policy request, wherein the risk-based pricing comprises partitioning the vehicle listed in the request into a plurality of components, determining a correlation between failure rates of each of the plurality of components and costs to effect repair of the failed component with the stored vehicle warranty related information, deriving an expected cost of policy claims from the correlations and setting a policy proffer price covering the expected cost of policy claims plus a predetermined profit margin;
    suggesting terms and conditions for the risk-based priced policy; and
    outputting the price and the suggested terms and conditions for the vehicle warranty policy request.

18. The method according to claim 17, wherein receiving a request for a vehicle warranty policy comprises using an electronic channel connected to the Internet.

19. The method according to claim 17, wherein receiving a request for a vehicle warranty policy comprises using an electronic channel connected to a public switched telephone network, wherein the vehicle warranty policy request is handled by a telephone operator.

20. The method according to claim 17, wherein receiving a request for a vehicle warranty policy comprises using an electronic channel connected to a voice activated network, wherein a voice synthesizer generates a facsimile of speech guiding a customer to prepare the request and a speech recognition system recognizes aural responses generated from the customer.

21. The method according to claim 17, wherein receiving a request for a vehicle warranty policy comprises using an electronic channel connected to a dual tone multi-frequency telephone network, wherein a voice synthesizer generates a facsimile of speech guiding a customer to prepare the request and a recognition system recognizes responses entered by a customer through key buttons on a dual tone multi-frequency telephone.

22. The method according to claim 17, wherein the stored plurality of vehicle warranty related information comprises a plurality of environmental information for geographic regions and a plurality of vehicle related information.

23. The method according to claim 17, further comprising storing a plurality of analytical tools.

24. The method according to claim 17, wherein the vehicle warranty related information comprises a plurality of environmental variables of a region within which the vehicle is likely to be operated over a term of the policy, make, model and year of the vehicle and the mileage of the vehicle at the time of starting the policy.

25. The method according to claim 17, wherein risk-based pricing the vehicle warranty policy request further comprises searching the stored historical vehicle warranty policies to find policies that are substantially similar to the policy request and comparing the derived expected cost of the policy request to the actual incurred costs set forth in the historical vehicle warranty policies.

26. The method according to claim 25, wherein risk-based pricing the vehicle warranty policy request further comprises adjusting the derived expected cost of the policy request to conform to the actual incurred costs set forth in the historical vehicle warranty policies.

27. The method according to claim 17, wherein the outputting comprises sending the price and the suggested terms and conditions for the vehicle warranty policy request to a system operator for review.

28. The method according to claim 27, further comprising enabling the system operator to accept or reject the price, terms and conditions of the serviced policy request and manually enter a modified price, terms and conditions for the policy request.

29. The method according to claim 28, further comprising communicating to the customer of the vehicle warranty policy request whether the request has been accepted and the price, terms and conditions of the policy or whether the request has been rejected.

30. The method according to claim 17, wherein the outputting comprises using an electronic channel connected to the Internet.

31. The method according to claim 17, wherein the outputting comprises using an electronic channel connected to a public switched telephone network, wherein the serviced request is communicated to a customer by a telephone operator.

32. The method according to claim 17, wherein the outputting comprises using an electronic channel connected to a voice activated network, wherein a voice synthesizer generates a facsimile of speech communicating the results of the serviced request to a customer.

33. A system for performing risk-based pricing of a vehicle warranty insurance policy, comprising:
a vehicle warranty policy request input source for receiving a request for a vehicle warranty policy;
a historical database containing a plurality of historical vehicle warranty policies;
a plurality of databases each containing vehicle warranty related information;
a processor, coupled to the vehicle warranty policy request input source, the historical database, and the plurality of databases, for servicing the request for a vehicle warranty policy, the processor comprising means for risk-based pricing the request and means for suggesting terms and conditions for the risk-based policy, wherein the risk-based pricing means partitions the vehicle listed in the request into a plurality of components and determines a correlation between failure rates of each of the plurality of components and costs to effect repair of the failed component with the vehicle warranty related information contained in the plurality of databases; and
a vehicle warranty policy output source, coupled to the processor, for outputting the serviced request for a vehicle warranty policy.

34. The system according to claim 33, wherein the vehicle warranty policy request input source comprises an electronic channel connected to the Internet.

35. The system according to claim 33, wherein the vehicle warranty policy request input source comprises an electronic channel connected to a public switched telephone network, wherein the vehicle warranty policy request is handled by a telephone operator.

36. The system according to claim 33, wherein the vehicle warranty policy request input source comprises an electronic channel connected to a voice activated network, wherein a voice synthesizer generates a facsimile of speech guiding a customer to prepare the request and a speech recognition system recognizes aural responses generated from the customer.

37. The system according to claim 33, wherein the vehicle warranty policy request input source comprises an electronic channel connected to a dual tone multi-frequency telephone network, wherein a voice synthesizer generates a facsimile of speech guiding a customer to prepare the request and a recognition system recognizes responses entered by a customer through key buttons on a dual tone multi-frequency telephone.

38. The system according to claim 33, wherein the plurality of databases comprise an environmental database containing a plurality of environmental information for geographic regions and a vehicle database containing vehicle related information.

39. The system according to claim 33, wherein the plurality of databases comprise a plurality of analytical tools.

40. The system according to claim 33, wherein the risk-based pricing means derives an expected cost of policy claims from the correlations and sets a policy proffer price covering the expected cost of policy claims plus a predetermined profit margin.

41. The system according to claim 40, wherein the vehicle warranty related information comprises a plurality of environmental variables of a region within which the vehicle is likely to be operated over a term of the policy, make, model and year of the vehicle and the mileage of the vehicle at the time of starting the policy.

42. The system according to claim 40, wherein the risk-based pricing means searches the historical database for historical vehicle warranty policies that are substantially similar to the policy request and compares the derived expected cost of the policy request to the actual incurred costs set forth in the historical vehicle warranty policies.

43. The system according to claim 42, wherein the risk-based pricing means adjusts the derived expected cost of the policy request to conform to the actual incurred costs set forth in the historical vehicle warranty policies.

44. The system according to claim 33, wherein the vehicle warranty policy output source comprises a system operator input/output enabling a system operator to review the price, terms and conditions of the serviced policy request.

45. The system according to claim 44, wherein the system operator input/output comprises means for accepting or rejecting the price, terms and conditions of the serviced policy request and means for manually entering a modified price, terms and conditions for the policy request.

46. The system according to claim 45, wherein the vehicle warranty policy output source further comprises means for communicating to the customer of the vehicle warranty policy request whether the request has been accepted and the price, terms and conditions of the policy or whether the request has been rejected.

47. The system according to claim 33, wherein the vehicle warranty policy output source comprises an electronic channel connected to the Internet.

48. The system according to claim 33, wherein the vehicle warranty policy output source comprises an electronic channel connected to a public switched telephone network, wherein the serviced request is communicated to a customer by a telephone operator.

49. The system according to claim 33, wherein the vehicle warranty policy output source comprises an electronic channel connected to a voice activated network, wherein a voice synthesizer generates a facsimile of speech communicating the results of the serviced request to a customer.

50. A method for performing risk-based pricing of a vehicle warranty insurance policy, comprising:

receiving a request for a vehicle warranty policy;

storing a plurality of historical vehicle warranty policies;

storing a plurality of vehicle warranty related information;

risk-based pricing the vehicle warranty policy request, wherein the risk-based pricing comprises partitioning the vehicle listed in the request into a plurality of components and determining a correlation between failure rates of each of the plurality of components and costs to effect repair of the failed component with the stored vehicle warranty related information;

suggesting terms and conditions for the risk-based priced policy according to the risk-based pricing; and outputting the price and the suggested terms and conditions for the vehicle warranty policy request.

51. The method according to claim 50, wherein receiving a request for a vehicle warranty policy comprises using an electronic channel connected to the Internet.

52. The method according to claim 50, wherein receiving a request for a vehicle warranty policy comprises using an electronic channel connected to a public switched telephone network, wherein the vehicle warranty policy request is handled by a telephone operator.

53. The method according to claim 50, wherein receiving a request for a vehicle warranty policy comprises using an electronic channel connected to a voice activated network, wherein a voice synthesizer generates a facsimile of speech guiding a customer to prepare the request and a speech recognition system recognizes aural responses generated from the customer.

54. The method according to claim 50, wherein receiving a request for a vehicle warranty policy comprises using an electronic channel connected to a dual tone multi-frequency telephone network, wherein a voice synthesizer generates a facsimile of speech guiding a customer to prepare the request and a recognition system recognizes responses entered by a customer through key buttons on a dual tone multi-frequency telephone.

55. The method according to claim 50, wherein the stored plurality of vehicle warranty related information comprises a plurality of environmental information for geographic regions and a plurality of vehicle related information.

56. The method according to claim 50, further comprising storing a plurality of analytical tools.

57. The method according to claim 50, wherein risk-based pricing the vehicle warranty policy request further comprises deriving an expected cost of policy claims from the correlations and setting a policy proffer price covering the expected cost of policy claims plus a predetermined profit margin.

58. The method according to claim 57, wherein the vehicle warranty related information comprises a plurality of environmental variables of a region within which the vehicle is likely to be operated over a term of the policy, make, model and year of the vehicle and the mileage of the vehicle at the time of starting the policy.

59. The method according to claim 57, wherein risk-based pricing the vehicle warranty policy request further comprises searching the stored historical vehicle warranty policies to find policies that are substantially similar to the policy request and comparing the derived expected cost of the policy request to the actual incurred costs set forth in the historical vehicle warranty policies.

60. The method according to claim 59, wherein risk-based pricing the vehicle warranty policy request further comprises adjusting the derived expected cost of the policy request to conform to the actual incurred costs set forth in the historical vehicle warranty policies.

61. The method according to claim 50, wherein the outputting comprises sending the price and the suggested terms and conditions for the vehicle warranty policy request to a system operator for review.

62. The method according to claim 61, further comprising enabling the system operator to accept or reject the price, terms and conditions of the serviced policy request and manually enter a modified price, terms and conditions for the policy request.

63. The method according to claim 62, further comprising communicating to the customer of the vehicle warranty policy request whether the request has been accepted and the price, terms and conditions of the policy or whether the request has been rejected.

64. The method according to claim 50, wherein the outputting comprises using an electronic channel connected to the Internet.

65. The method according to claim 64, wherein the outputting comprises using an electronic channel connected to a public switched telephone network, wherein the serviced request is communicated to a customer by a telephone operator.

66. The method according to claim 50, wherein the outputting comprises using an electronic channel connected to a voice activated network, wherein a voice synthesizer generates a facsimile of speech communicating the results of the serviced request to a customer.

* * * * *